US012748247B2

(12) United States Patent
Ohno

(10) Patent No.: US 12,748,247 B2
(45) Date of Patent: Sep. 29, 2026

(54) OPTICAL ELEMENT ASSEMBLY, OPTICAL APPARATUS, ESTIMATION METHOD, AND NON-TRANSITORY STORAGE MEDIUM STORING ESTIMATION PROGRAM

(71) Applicant: KABUSHIKI KAISHA TOSHIBA, Tokyo (JP)

(72) Inventor: Hiroshi Ohno, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1177 days.

(21) Appl. No.: 17/652,491

(22) Filed: Feb. 25, 2022

(65) Prior Publication Data

US 2023/0090825 A1 Mar. 23, 2023

(30) Foreign Application Priority Data

Sep. 16, 2021 (JP) ................................ 2021-151125

(51) Int. Cl.
*G02B 5/20* (2006.01)
*G01C 3/08* (2006.01)

(52) U.S. Cl.
CPC .............. *G02B 5/201* (2013.01); *G01C 3/08* (2013.01)

(58) Field of Classification Search
CPC . G02B 5/201; G02B 3/10; G02B 7/36; G01C 3/08
See application file for complete search history.

(56) References Cited

U.S. PATENT DOCUMENTS 10,180,529 B2 1/2019 Ohno et al.
10,620,389 B1 4/2020 Kamikawa et al.
10,732,102 B2 8/2020 Ohno et al.
10,812,786 B2 10/2020 Ohno et al.
10,901,134 B2 1/2021 Ohno et al.
11,030,760 B2 6/2021 Kashiwagi et al.
(Continued)

FOREIGN PATENT DOCUMENTS

JP 2003-98426 A 4/2003
JP 2003098426 A * 4/2003 ............ G02B 13/00
(Continued)

OTHER PUBLICATIONS

W.L. Howes, "Rainbow schlieren and its applications," Applied Optics, vol. 23, No. 14, pp. 2449-2460 (1984).
(Continued)

*Primary Examiner* — Thanh Luu
*Assistant Examiner* — Mai Thi Ngoc Tran
(74) *Attorney, Agent, or Firm* — Finnegan, Henderson, Farabow, Garrett & Dunner, LLP

(57) ABSTRACT

According to the embodiment, an optical element assembly includes a wavelength selection portion and an imaging optical element. The wavelength selection portion includes a plurality of wavelength selection regions. The wavelength selection portion is configured to emit wavelengths different among the plurality of wavelength selection regions. The imaging optical element includes a plurality of different regions. The plurality of regions of the imaging optical element has focal lengths different from each other. Each of the regions of the imaging optical element optically faces corresponding one of the wavelength selection regions of the wavelength selection portion.

7 Claims, 4 Drawing Sheets

(56) References Cited

U.S. PATENT DOCUMENTS

| | | | | |
|---|---|---|---|---|
| 2013/0215231 | A1* | 8/2013 | Hiramoto | G03B 35/10 348/46 |
| 2019/0364267 | A1* | 11/2019 | Ohno | H04N 17/002 |
| 2020/0150326 | A1 | 5/2020 | Kano et al. | |
| 2020/0294260 | A1* | 9/2020 | Kashiwagi | G06T 7/571 |
| 2021/0293537 | A1 | 9/2021 | Ohno et al. | |
| 2021/0293723 | A1* | 9/2021 | Ohno | G01N 21/85 |
| 2022/0084240 | A1 | 3/2022 | Ohno | |
| 2022/0086326 | A1 | 3/2022 | Ohno et al. | |
| 2022/0146435 | A1 | 5/2022 | Ohno | |

FOREIGN PATENT DOCUMENTS

| | | | |
|---|---|---|---|
| JP | 2008-209726 | A | 9/2008 |
| JP | 5268094 | B2 | 8/2013 |
| JP | 2014-191920 | A | 10/2014 |
| JP | 2019-124542 | A | 7/2019 |
| JP | 2019-203796 | A | 11/2019 |
| JP | 2020-46232 | A | 3/2020 |
| JP | 2020-76717 | A | 5/2020 |
| JP | 2020-122702 | A | 8/2020 |
| JP | 2020-148483 | A | 9/2020 |
| JP | 2021-148531 | A | 9/2021 |
| JP | 2022-49047 | A | 3/2022 |
| JP | 2022-49881 | A | 3/2022 |
| JP | 2022-75314 | A | 5/2022 |

OTHER PUBLICATIONS

J. Kim et al., "Multiaperture telecentric lens for 3D reconstruction," Optics Letters, vol. 36, No. 7, pp. 1050-1052 (2011).

T. Kim et al. "Chromatic confocal microscopy with a novel wavelength detection method using transmittance," Optics Express, vol. 21, No. 5, pp. 6286-6294 (2013).

P. Trouve, "Passive depth estimation using chromatic aberration and a depth from defocus approach," Applied Optics, vol. 52, No. 29, pp. 7152-7164 (2013).

H. Ohno, "One-shot three-dimensional measurement method with the color mapping of light direction," OSA Continuum, vol. 4, No. 3, pp. 840-848 (2021).

P.S. Greenberg et al. "Quantitative rainbow schlieren deflectometry," Applied Optics, vol. 34, No. 19, p. 3810-3822 (1995).

* cited by examiner

OPTICAL ELEMENT ASSEMBLY, OPTICAL APPARATUS, ESTIMATION METHOD, AND NON-TRANSITORY STORAGE MEDIUM STORING ESTIMATION PROGRAM

CROSS-REFERENCE TO RELATED APPLICATIONS

This application is based upon and claims the benefit of priority from Japanese Patent Application No. 2021-151125, filed Sep. 16, 2021, the entire contents of all of which are incorporated herein by reference.

FIELD

Embodiments of the present invention relate to an optical element assembly, an optical apparatus, an estimation method, and a non-transitory storage medium storing an estimation program.

BACKGROUND

A method of using images captured by a plurality of cameras to acquire the distance (depth) to an object is generally performed. Further, in recent years, a technique of acquiring the distance to an object using images captured by one image capturing apparatus (monocular camera) is receiving attention.

BRIEF DESCRIPTION OF TEE DRAWINGS

DETAILED DESCRIPTION

Figure 1:
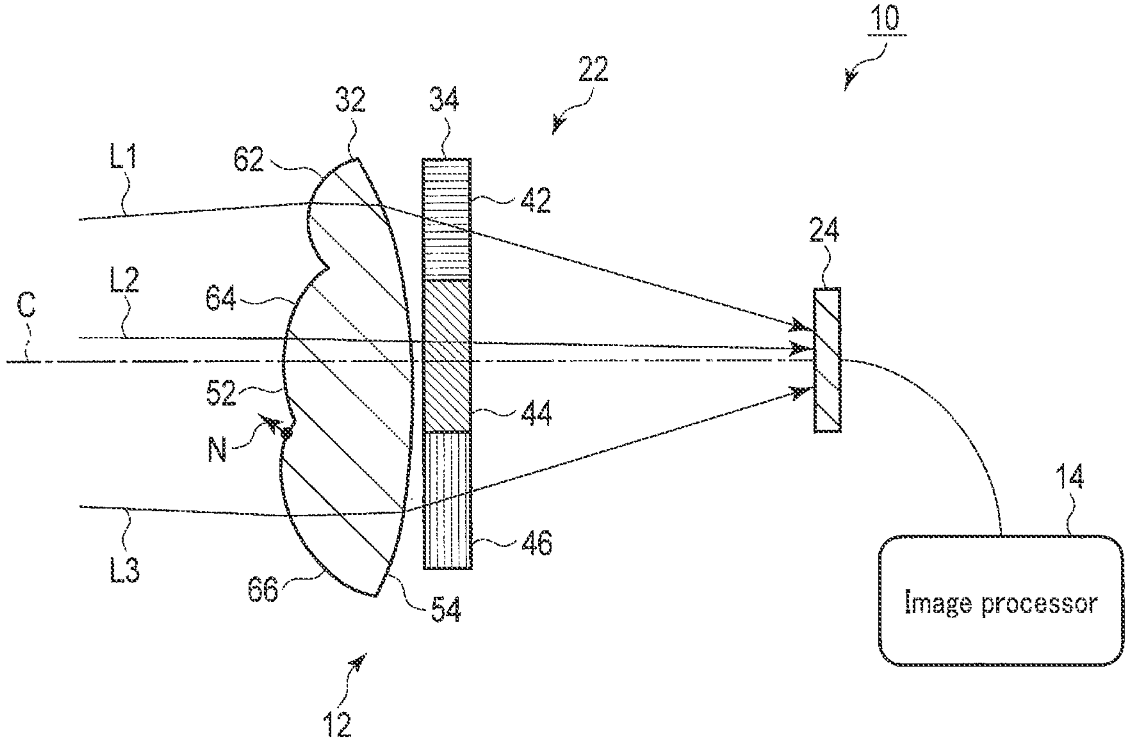
FIG. 1 is a schematic view showing an optical apparatus according to the first embodiment.

An object of an embodiment is to provide an optical element assembly, an optical apparatus, an estimation method, and a non-transitory storage medium storing an estimation program used to acquire the distance and/or the farness/nearness of an object.

According to the embodiment, an optical element assembly includes a wavelength selection portion and an imaging optical element. The wavelength selection portion includes a plurality of wavelength selection regions. The wavelength selection portion is configured to emit wavelengths different among the plurality of wavelength selection regions. The imaging optical element includes a plurality of different regions. The plurality of regions of the imaging optical element has focal lengths different from each other. Each of the regions of the imaging optical element optically faces corresponding one of the wavelength selection regions of the wavelength selection portion.

Each embodiment of the present invention will be described hereinafter with reference to the accompanying drawings. Each drawing is schematic or conceptual and the relationship between the thickness and the width of each part and the size ratio between the respective parts are not necessarily the same as actual ones. In addition, even when the same portions are shown, the portions are sometimes shown in different dimensions and ratios depending on the drawings. Note that in this specification and the respective drawings, the same reference numerals denote the same components described with reference to the drawings already referred to. A detailed description of such components will be omitted as appropriate.

First Embodiment

An optical apparatus 10 according to the first embodiment will be described with reference to FIGS. 1 and 2.

As shown in FIG. 1, the optical apparatus 10 according to this embodiment includes an image acquisition portion 12 and an image processor 14. The image acquisition portion 12 acquires images corresponding to at least two or more different colors. That is, the image acquisition portion 12 acquires images corresponding to at least two color channels. Here, different colors mean light beams in different wavelength ranges. The image acquisition portion 12 includes an optical element assembly 22 and an image sensor 24. The optical element assembly 22 includes an imaging optical element 32 and a wavelength selection portion 34.

The image processor 14 calculates information regarding the farness/nearness (relative distance) and/or the distance from the image acquisition portion 12 of the optical apparatus 10 to an object.

It is known that light can be handled as an electromagnetic wave by Maxwell's equations. In this embodiment, light may be visible light, an X-ray, an ultraviolet ray, an infrared ray, a far-infrared ray, a millimeter wave, or a microwave. That is, electromagnetic waves of various wavelengths are referred to as light here. Particularly, light in a wavelength range of about 360 nm to 830 nm is referred tor as visible light, and the light in a following description is assumed to be visible light.

The imaging optical element 32 may be a lens, a set Lens, a gradient index lens, a diffractive lens, a reflective mirror, or the like, and anything that images light may be used. The imaged light is received by the image sensor 24. In the image sensor 24, the received light is converted (photoelectrically converted) into an electrical signal. Thus, images corresponding to at least two or more color channels can be acquired. The imaging optical element 32 transfers the light from an object point on the object to an image point along the optical axis. That is, the imaging optical element 32 condenses the light from the object point to the image point, thereby imaging the light.

The image sensor 24 is, for example, a CCD (Charge Coupled Device) image sensor, a CMOS (Complementary Metal Oxide Semiconductor) image sensor, or the like. The shape of the image sensor 24 may be rectangular or square for an area-type image sensor, or may be linear for a line-type image sensor. The image sensor 24 includes at least two or more pixels. Each pixel respectively receives, for example, blue light (B) in the first wavelength range, green light (G) in the second wavelength range, and red light (R) in the third wavelength range. When an object is imaged by the imaging optical element 32 on the image sensor 24, the object is captured as an image. The image is a color image (BGR image), and this image includes a B image, a G image, and an R image.

The wavelength selection portion 34 includes at least two or more different wavelength selection regions. The wavelength selection portion 34 according to this embodiment includes three wavelength selection regions 42, 44, and 46. For example, the first wavelength selection region 42 allows blue light (B) in a wavelength range of 400 nm to 500 nm to pass therethrough, the second wavelength selection region 44 allows green light (G) in a wavelength range of 500 nm to 600 nm to pass therethrough, and the third wavelength selection region 46 allows red light (R) in a wavelength range of 600 nm to 800 nm to pass therethrough. Here, the wavelength ranges of the two different wavelength selection regions may overlap each other.

Assume that the imaging optical element 32 in this embodiment is, for example, a single lens. The imaging optical element 32 has an optical axis C, and includes two surfaces 52 and 54 facing each other along the optical axis C. The two surfaces 52 and 54 are referred to as the first surface 52 and the second surface 54. The first surface 52 faces the object side. The second surface 54 faces the side of the wavelength selection portion 34 and the image sensor 24 (image side). That is, the normal of the first surface 52 and the normal of the second surface 54 face substantially opposite sides.

The first surface 52 includes at least two or more regions. In this embodiment, the first surface 52 includes three different regions 62, 64, and 66. That is, the first surface 52 includes the first region 62, the second region 64, and the third region 66. Normals N in the surfaces of the respective regions 62, 64, and 66 are discontinuous in the boundary surface between the region 62 and the region 64 and in the boundary surface between the region 64 and the region 66. The regions 62, 64, and 66 may be arranged, for example, side by side in one direction or may be arranged, for example, concentrically.

The imaging optical element 32 formed by the first region 62 of the first surface 52 and the second surface 54 other than the first surface 52 has a first focal length f1. The imaging optical element 32 formed by the second region 64 of the first surface 52 and the second surface 54 other than the first surface 52 has a second focal length f2. The imaging optical element 32 formed by the third region 66 of the first surface 52 and the second surface 54 other than the first surface 52 has a third focal length f3. At least two or more of the first focal length f1, the 10) second focal length f2, and the third focal length f3 are different from each other. Here, the different regions 62, 64, and 66 of the imaging optical element 32 have different focal lengths. That is, the first focal length f1, the second focal length f2, and the third focal length f3 are all different from each other.

The wavelength selection portion 34 is arranged on the optical axis C of the imaging optical element (lens) 32. The wavelength selection portion 34 may be arranged between the imaging optical element (lens) 32 and the image sensor 24, or may be arranged between the imaging optical element 32 and the object. In this embodiment, for example, the wavelength selection portion is arranged between the imaging optical element 32 and the image sensor 24.

The image processor 14 is formed by, for example, a computer or the like, and includes a processor (processing circuit) and a storage medium (non-transitory storage medium). The processor includes any one of a CPU (Central Processing Unit), an ASIC (Application Specific Integrated Circuit), a microcomputer, an FPGA (Field Programmable Gate Array), a DSP (Digital Signal Processor), and the like. The storage medium can include an auxiliary memory device in addition to a main memory device such as a memory. Examples of the non-transitory storage medium can include an HDD (Hard Disk Drive), an SSD (Solid State Drive), a magnetic disk, an optical disk (such as a CD-ROM, a CD-R, or a DVD) an optical magnetic disk (such as an MO), and a non-volatile random access memory such as a semiconductor memory.

In the optical apparatus 10, each of the number of processors and the number of non-transitory storage media may be one or plural. In the optical apparatus 10, the processor executes a program or the like stored in the non-transitory storage medium or the like, thereby executing a process. In addition, the program that is executed by the processor of the optical apparatus 10 may be stored in a computer (server) connected to the optical apparatus 10 via a network such as the Internet, or may be stored in a server or the like in a cloud environment. In this case, the processor downloads the program via the network.

Only one processor and only one storage medium may be provided in the image processor 14, or a plurality of processors and a plurality of storage media may be provided therein. In the image processor 14, the processor performs processing by executing a program or the like stored in the storage medium or the like. The program executed by the processor of the image processor 14 may be stored in a computer (server) connected to the image processor 14 via a network such as the Internet, or a server or the like in a cloud environment. In this case, the processor downloads the program via the network. In the image processor 14, the processor or the like acquires an image from the image sensor 24 and performs various kinds of calculation processing based on the image acquired from the image sensor 24, and the storage medium functions as a data storage unit.

As least some of processing operations performed by the image processor 14 may be performed by a cloud server formed in the cloud environment. The infrastructure of the cloud environment is formed by a virtual processor such as a virtual CPU and a cloud memory. In an example, the virtual processor acquires an image from the image sensor 24 and performs various kinds of calculation processing based on the image acquired from the image sensor 24, and the cloud memory functions as the data storage unit.

An estimation method for the farness/nearness and/or the distance of an object using the optical apparatus 10 according to this embodiment will be described using the flowchart illustrated in FIG. 2. Note that an estimation program for causing the computer to perform the estimation method is stored in a non-transitory storage medium.

A first light beam L1 of the light from an object enters the imaging optical element (lens) 32, passes through the first region 62 of the first surface 52 of the imaging optical element 32, further passes through the first wavelength selection region 42 of the wavelength selection portion 34, and is imaged on the image sensor 24. The first light beam L1 becomes blue light (B) after passing through the first wavelength selection region 42. The first region 62 of the first surface 52 of the imaging optical element 32 has the first focal length f1, and the first light beam L1 images the first object point (not shown) at the first image point (not clearly shown) according to the lens formula of geometric optics. Here, if the first region 62 has the first focal length f1, this means that when the light beam passing through the first region 62 is imaged by the imaging optical element 32, the light beam passing region of the imaging optical element 32 where the light beam has passed through, that is, the region including the first region 62 of the imaging optical element 32 has the first focal length f1.

A second light beam L2 of the light from the object enters the imaging optical element (lens) 32, passes through the second region 64 of the first surface 52 of the imaging optical element 32, further passes through the second wavelength selection region 44 of the wavelength selection portion 34, and is imaged on the image sensor 24. The second light beam L2 becomes green light (G) after passing through the second wavelength selection region 44. The second region 64 of the first surface 52 of the imaging optical element 32 has the second focal length f2, and the second light beam L2 images the second object point (not shown) at the second image point (not clearly shown) according to the lens formula of geometric optics.

A third light beam L3 of the light from the object enters the imaging optical element (lens) 32, passes through the third region 66 of the first surface 52 of the imaging optical element 32, further passes through the third wavelength selection region 46 of the wavelength selection portion 34, and is imaged on the image sensor 24. The third light beam L3 becomes red light (R) after passing through the third wavelength selection region 46. The third region 66 of the first surface 52 of the imaging optical element 32 has the third focal length f3, and the third light beam L3 images the third object point (not shown) at the third image point (not clearly shown) according to the lens formula of geometric optics.

The first focal length f1, the second focal length f2, and the third focal length f3 are different from each other. Therefore, when the first object point, the second object point, and the third object point are imaged at the respective image points on the image sensor 24, the distances of the first object point, the second object point, and the third object point from the imaging optical element 32 or the image sensor 24 are different from each other.

The distance from the imaging optical element 32 or the image sensor 24 to the object point is referred to as a depth distance (depth). That is, the depth distances of the first object point, the second object point, and the third object point are different from: each other. In this embodiment, the image sensor 24 captures the respective object points in different colors. The first object point is captured in blue, the second object point is captured in green, and the third object point is captured in red. With this, the image processor 14 can simultaneously acquire, from the image sensor 24, images of different depth distances using a blue image, a green image, and a red image. That is, the image processor 14 can simultaneously acquire images of at least two or more depth distances, which are images of three depth distances in this embodiment (step ST1).

The image processor 14 calculates the contrast (degree of blur) of a partial image region (a common region of the object) for each of the blue image, the green image, and the red image acquired by the image sensor 24 (step ST2). There are various contrast calculation methods (for example, see P. Trouve, et al., "Passive depth estimation using chromatic aberration and a depth from defocus approach," APPLIED OPTICS/Vol. 52, No. 29, 2013.), but it can be said that the contrast decreases as the spatial low frequency component increases more than the spatial high frequency component.

Normally, the contrast increases if the object point and the image point meet the lens formula of geometric optics, and the contrast decreases if the object point and the image point do not meet the lens formula. Alternatively, the image is in focus if the object point and the image point meet the lens formula of geometric optics. On the other hand, the image is out of focus if the object point and the image point do not meet the lens formula. Normally, the image is more likely to blur when the object approaches the lens than when it moves away from the lens. Therefore, the image processor 14 uses the blue image, the green image, and the red image to calculate the contrast of the common region of the object from each image. It can be said that, among the respective color images of the common region, the color image with the highest contrast best images the common region of the object. With respect to the depth distance of the object in the common region, the closer the focal length is to the focal length which meets the lens formula, the more ideal imaging occurs. Accordingly, when the image processor 14 searches for the image of the color in which the contrast is high and specifies the image of this color, the focal length corresponding to this color image (closest one of the first focal length f1, the second focal length f2, and the third focal length f3) can be determined, and the depth distance can be estimated. That is, the image processor 14 estimates the depth distance of the object by calculating the color in which the contrast of the color image becomes highest, and collating the focal length of the calculated color (step ST3).

Note that DfD (Depth-from-defocus) is known as a method of estimating the depth distance. DfD is a technique of calculating the distance from two images having different focuses. In this embodiment, the image processor 14 acquires three color images having different focuses in the common region of the object. The image processor 14 according to this embodiment can use, for example, DfD to calculate the depth distance of the object from the imaging optical element 32 or the image sensor 24 based on the contracts of the respective color images and the optical information (the focal length f1 of the first region 62, the focal length f2 of the second region 64, and the focal length f3 of the third region 66) of the imaging optical element 32.

Alternatively, as the method of estimating the depth distance, the image processor 14 first calculates the color in which the contrast of the color image becomes highest, and determines the focal length (one of the focal length f1 of the first region 62, the focal length f2 of the second region 64, and the focal length f3 of the third region 66) corresponding to the calculated color. The first depth distance is acquired from the determined focal length using the lens formula. However, the depth distance calculated from the lens formula is the depth distance at the time of imaging (at the time of in-focus), and this is a case in which the contrast with respect to the depths is maximum. Therefore, the first depth distance is an approximate estimation value. Similarly, the colors in which the contrast of the color image becomes second and third highest are calculated, and the focal lengths corresponding to the calculated colors are determined. Thus, the second and third approximate depth distances corresponding to the respective focal lengths are determined using the lens formula. From this, it can be found that, with the first depth distance as a reference, the depth distance is closer to the second depth distance and farther than the third depth distance. That is, as compared to a case of calculating the depth distance using at least one color image, the estimation accuracy of the depth distance increases in a case in which two or more color images are used.

This method will be described more specifically. For example, assume that an object is placed facing the imaging optical element 32. Further, assume that the relationship among the first focal length f1, the second focal length f2, and the third focal length f3 on the object side is expressed as, for example, the first focal length f1>the second focal length f2>the third focal length f3. At this time, when the distance from the imaging optical element 32 to the image plane (that is, the image sensor 24) is determined, the depth distance corresponding to each focal length is determined from the lens formula. That is, the first depth distance corresponding to the first focal length f1, the second depth distance corresponding to the second focal length f2, and the third depth distance corresponding to the third focal length f3 are determined. Here, the first depth distance, the second depth distance, and the third depth distance are far from the imaging optical element 32 in this order. The image processor 14 acquires the blue image, the green image, and the red image corresponding to the order of the first focal length, the second focal length, and the third focal lengths and calculates the contrasts of the respective images to compare the contrasts.

At this time, assume that the contrast of the green image is the highest. Since the contrast of the green image is the highest, the image processor 14 outputs that the object point of the object is located at a position closer to the second depth distance than the first depth distance and the object point of the object is located at a position closer to the second depth distance than the third depth distance. Accordingly, the image processor 14 can estimate that the object point of the object corresponding to the image point is located at a position between the first depth distance and the second depth distance or a position between the third depth distance and the second depth distance.

Further, if the contrast of the blue image is the second highest, that is, the second highest after the green image, it can be found that the depth distance is closer to the first depth distance than the third depth distance. That is, it can be estimated that the depth distance is between the first depth distance and the second depth distance.

Also in a case in which the contrast of the blue image is the highest and a case in which the contrast of the red image is the highest, the image processor 14 can estimate the depth distance of the object point of the object.

Further, by weighting the first depth distance, the second depth distance, and the third depth distance based on the contrasts of the respective color images, the accurate depth distance can be estimated. Such weighting may be one used in DfD.

In this embodiment, an example has been described in which the image processor 14 estimates the distance between the object and the imaging optical element 32 or the image sensor 24 based on the contrasts of at least two images out of the red image, the green image, and the blue image. The image processor 14 may calculate the depth distance of the object using, for example, the mixing ratio of the blue pixel value and the green pixel value, the mixing ratio of the green pixel value and the red pixel value, and the mixing ratio of the blue pixel value and the red pixel value in each pixel together with the contrasts or in place of the contrasts.

The image processor 14 may estimate the distance between the object point of the object and the imaging optical element 32 by performing, using artificial intelligence (including machine learning, deep learning, or the like), image processing regarding the degree of blur or the like of the image of each color.

Accordingly, the image processor 14 can calculate the depth distance of an object based on a plurality of color images having different focal lengths using an appropriate distance calculation technique.

Note that in this embodiment, an example has been described in which the distance of an object with respect to the imaging optical element 32 or the image sensor 24 is measured. For example, assume that there are a plurality of objects facing the optical element assembly 22. In this case, based on the contrasts of the red image, the green image, and the blue image and optical information (the focal lengths f1, f2, and f3 of the three different regions 62, 64, and 66 of the first surface 52) of the imaging optical element 32, the image processor 14 can estimate not only the distance of the object with respect to the imaging optical element 32 or the image sensor 24 but also the farness/nearness of the object with respect to the imaging optical element 32 or the image sensor 24. That is, when there are a plurality of objects serving as targets, using the optical apparatus 10 according to this embodiment enables estimation of the distance of the object and the farness/nearness of the object with respect to the optical element assembly 22. Note that the optical apparatus 10 according to this embodiment may not necessarily estimate the distance of the object, but may only estimate the farness/nearness.

The optical element assembly 22 according to this embodiment includes the imaging optical element 32 and the wavelength selection portion 34. The wavelength selection portion 34 includes the plurality of wavelength selection regions 42, 44, and 46. The wavelength selection portion 34 emits different wavelengths different among the plurality of wavelength selection regions 42, 44, and 46. The imaging optical element 32 includes the plurality of different regions 62, 64, and 66. The plurality of regions 62, 64, and 66 of the imaging optical element 32 has the focal lengths f1, f2, and f3, respectively, different from each other. The regions 62, 64, and 66 of the imaging optical element 32 optically face the wavelength selection regions 42, 44, and 46 of the wavelength selection portion 34, respectively.

Therefore, when emitting light beams to the image sensor 24 to acquire images of respective color channels, the optical element assembly 22 can emit images having the focal lengths f1, f2, and f3 corresponding to the regions 62, 64, and 66, respectively, of the imaging optical element 32. Thus, the images captured by the image sensor 24 can have contrasts different among color channels. Hence, according to this embodiment, it is possible to provide the optical element assembly 22 used to acquire the distance and/or the farness/nearness of an object from images acquired by the image sensor 24, Hence, according to this embodiment, it is possible to provide the optical element assembly 22 used to acquire the distance and/or the farness/nearness of an object from images acquired by the image sensor 24, and the optical apparatus 10.

Modification

Figure 3:
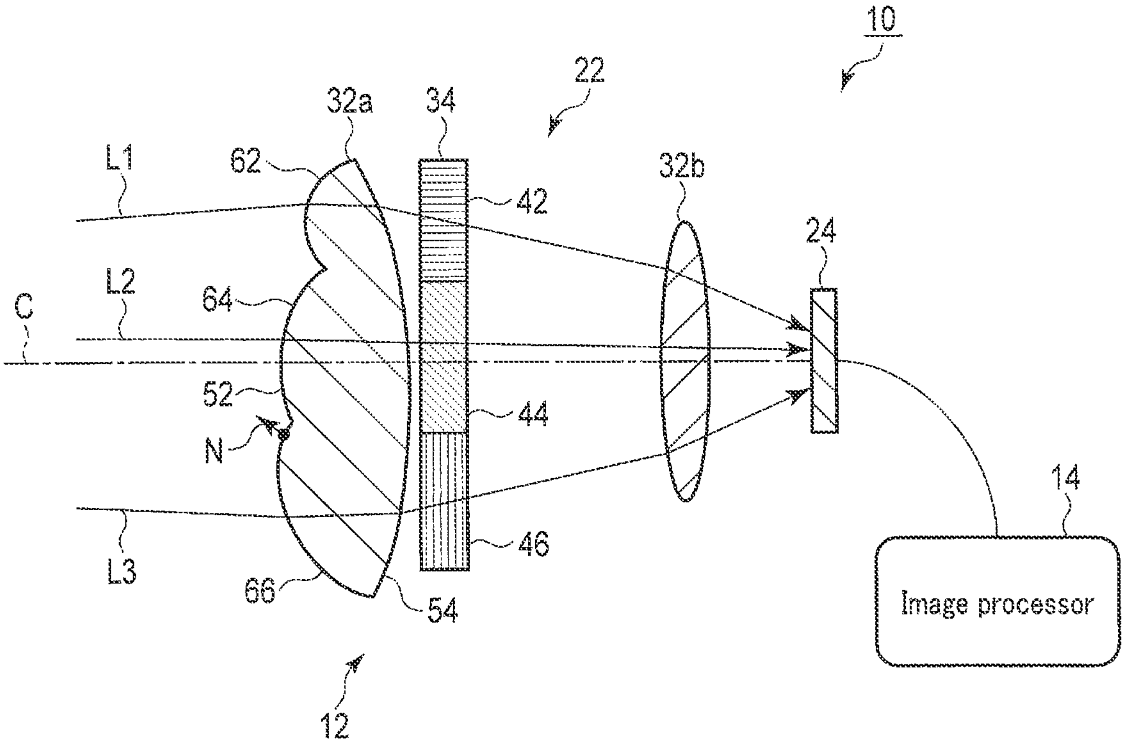
FIG. 3 is a schematic view showing the optical apparatus according to a modification of the first embodiment.

A modification of the optical apparatus 10 according to the first embodiment will be shown in FIG. 3.

As shown in FIG. 3, the imaging optical element 32 is a set lens including a first lens 32*a* and a second lens 32*b*. The imaging optical element 32 serves as the set lens and images the light from an object point at an image point along the optical axis C. The wavelength selection portion 34 is arranged between the first lens 32*a* and the second lens 32*b*.

With the arrangement as described above, as has been described in the first embodiment, it is possible to simultaneously acquire images of three different depth distances as different color images.

Depending on refractive index media before and after the imaging optical element 32, the object-side focal length may be equal to or different from the image-side focal length. In either case, by the image processor 14 calculating, for example, the color in which the contrast is the highest, it is possible to estimate the depth distance between the imaging optical element 32 or the image sensor 24 and the object. When there are a plurality of objects serving as targets, the image processor 14 can estimate the farness/nearness of the object with respect to the imaging optical element 32 or the image sensor 24.

According to this modification, it is possible to provide the optical element assembly 22 used to acquire the distance and/or the farness/nearness of an object from images acquired by the image sensor 24, and the optical apparatus 10.

Second Embodiment

An optical apparatus 10 according to the second embodiment will be described with reference to FIGS. 4 to 6. This embodiment is another modification of the first embodiment including the above modification. The same reference numerals denote, as much as possible, the same members or the members having the same functions as the members described in the first embodiment, and a detailed description thereof will be omitted.

Figure 4:
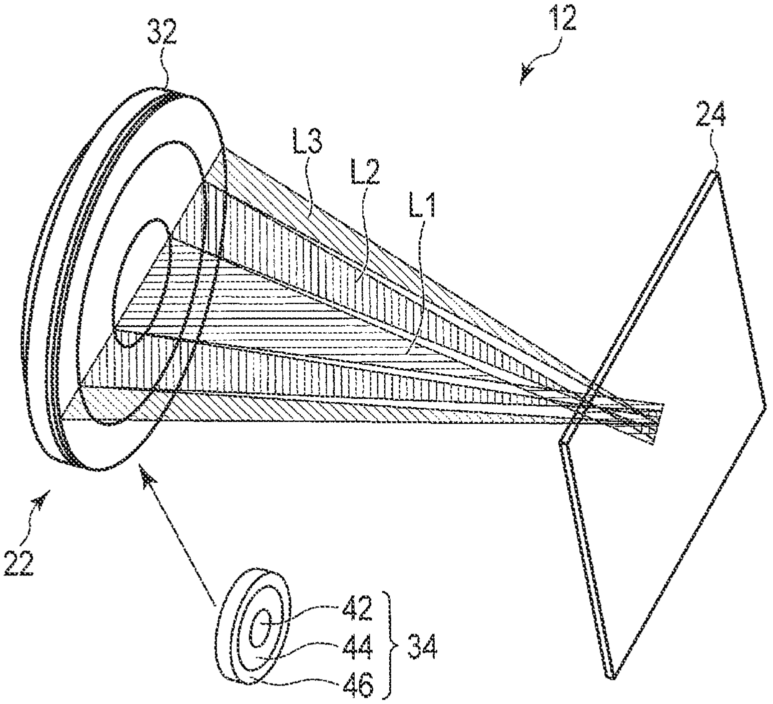
FIG. 4 is a schematic perspective view showing an image acquisition portion of an optical apparatus according to the second embodiment.
Figure 5:
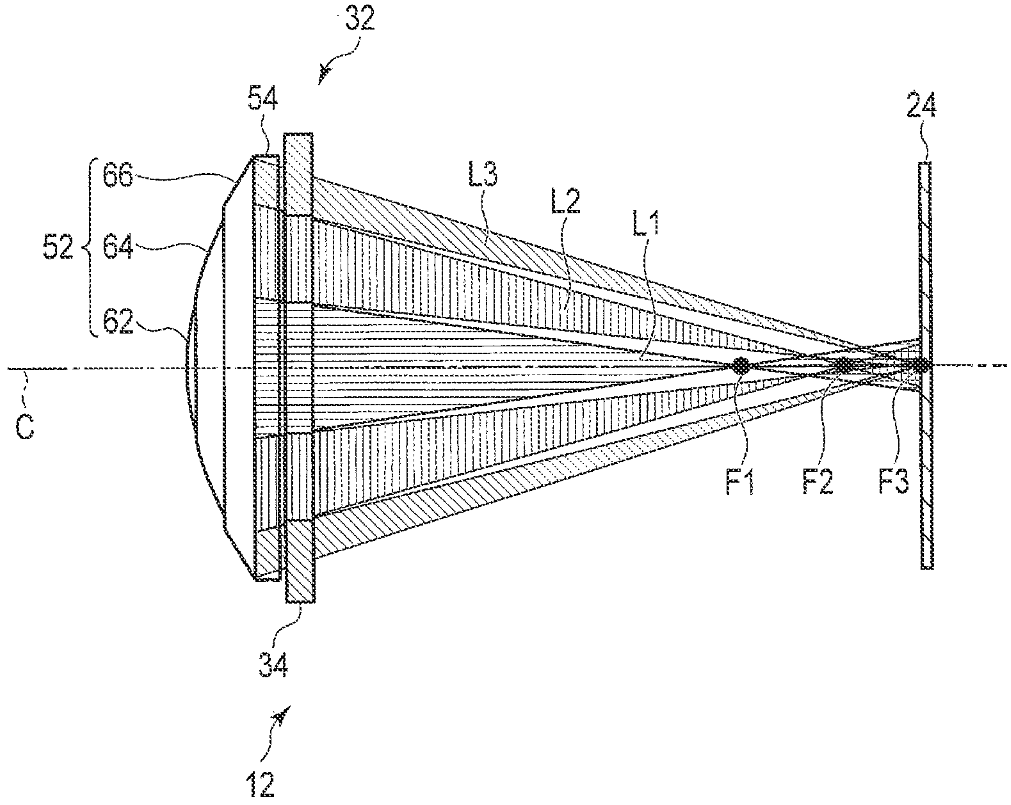
FIG. 5 is a schematic view showing the image acquisition portion of the optical apparatus shown in FIG. 4.

As shown in FIGS. 4 and 5, the optical apparatus 10 according to this embodiment basically has a structure similar to that in the first embodiment. An imaging optical element 32 is formed by a single lens. However, this embodiment is not limited to this, and the set lens described in the modification of the first embodiment or the like may be used. In the following description, the single lens is referred to as the imaging optical element 32.

The imaging optical element 32 according to this embodiment is rotationally symmetric. "Rotationally symmetric" means that when rotated around the axis of symmetry, the shape matches the original shape at a rotation angle smaller than 360°. Here, the axis of symmetry matches an optical axis C of the imaging optical element 32. In this embodiment, for example, the imaging optical element 32 is cylindrically symmetric with the optical axis C as the axis of symmetry.

A wavelength selection portion 34 has the same symmetry as the imaging optical element 32. That is, the wavelength selection portion 34 is rotationally symmetric as well. In this embodiment, the wavelength selection portion 34 is cylindrically symmetric. The thickness of the wavelength selection portion 34 may be sufficiently small. In this case, the wavelength selection portion 34 can be considered to be concentrically symmetric.

The imaging optical element 32 includes a first surface 52 and a second surface 54 facing each other along the optical axis C. For example, the first surface 52 includes a first region 62, a second region 64, and a third region 66. The normals in the surfaces of the respective regions 62, 64, and 66 are discontinuous in the boundary surface between the region 62 and the region 64 and in the boundary surface between the region 64 and the region 66. That is, the imaging optical element 32 includes at least two regions 62, 64, 66 in at least one first surface 52, and normals N are discontinuous in the boundary between the region 62 and the region 64 and the boundary between the region 64 and the region 66.

In this embodiment, the first region 62 is a region including the optical axis C. The second region 64 is an annular region outside the first region 62. The third region 66 is an annular region outside the second region 64. The curvature of the first region 62, the curvature of the second region 64, and the curvature of the third region 66 decrease in this order. Thus, in this embodiment, a focal length f1 of the first region 62, a focal length f2 of the second region 64, and a focal length f3 of the third region 66 increase in this order ($f1<f2<f3$) due to geometric optics.

In the imaging optical element 32 shown in FIGS. 4 and 5, assume that an object point is at infinity along the optical axis C. That is, each of a first light beam L1, a second light beam L2, and a third light beam L3 is light from infinity and a light beam parallel to the optical axis C. At this time, the light beams L1, L2, and L3 are condensed at focal points F1, F2, and F3, respectively, of the imaging optical element 32. Here, the imaging optical element. 32 and an image sensor 24 are arranged such that the third region 66 of the imaging optical element 32 condenses the third light beam L3 on the image sensor 24.

Of the light from the object, the first light beam L1 enters the imaging optical element 32, passes through the first region 62 of the first surface 52 of the imaging optical element 32, further passes through a first wavelength selection region 42 of the wavelength selection portion 34, and is imaged on the image sensor 24. The first light beam L1 becomes blue light (B) after passing through the first wavelength selection region 42. Since the imaging optical element 32 formed by the first region 62 has the first focal length f1 and the first light beam L1 is light parallel to the optical axis C from infinity, the first light beam L1 is condensed at the focal position F1 on the optical axis C according to the lens formula of geometric optics.

Of the light from the object, the second light beam 12 enters the imaging optical element 32, passes through the second region 64 of the first surface 52 of the imaging optical element 32, further passes through a second wavelength selection region 44 of the wavelength selection portion 34, and is imaged on the image sensor 24. The second light beam L2 becomes red light (R) after passing through the second wavelength selection region 44. Since the imaging optical element 32 formed by the second region 64 has the second focal length f2 and the second light beam L2 is light parallel to the optical axis C from infinity, the second light beam L2 is condensed at the focal position F2 on the optical axis C according to the lens formula of geometric optics.

Of the light from the object, the third light beam L3 enters the imaging optical element 32, passes through the third region 66 of the first surface 52 of the imaging optical element 32, further passes through a third wavelength selection region 46 of the wavelength selection portion 34, and is imaged on the image sensor 24. The third light beam L3 becomes green light (G) after passing through the third wavelength selection region 46. Since the imaging optical element 32 formed by the third region 66 has the third focal length f3 and the third light beam L3 is light parallel to the optical axis C from infinity, the third light beam L3 is condensed at the focal position F3 on the optical axis C according to the lens formula of geometric optics. As has been described above, the third region 66 of the imaging optical element 32 is formed such that the third light beam L3 is condensed on the image sensor 24. Accordingly, the condensed position (condensed point) F3 of the third light beam L3 by the third region 66 of the imaging optical element 32 is located on the image sensor 24.

Thus, the third light beam L3 is condensed on the image sensor 24. On the other hand, the first light beam L1 and the second light beam L2 are condensed at the condensed positions F1 and F2, respectively, on the front side of the image sensor 24 since the focal lengths (the first focal length f1 and the second focal length f2) corresponding to the surface regions (the first region 62 and the second region 64) of the imaging optical element 32 where the light beams L1 and L2 have passed through, respectively, are smaller than the focal length (the third focal length f3) for the third light beam L3.

An estimation method of the farness/nearness and/or the distance of an object using the optical apparatus 10 according to this embodiment will be described with reference to FIG. 6.

Figure 6:
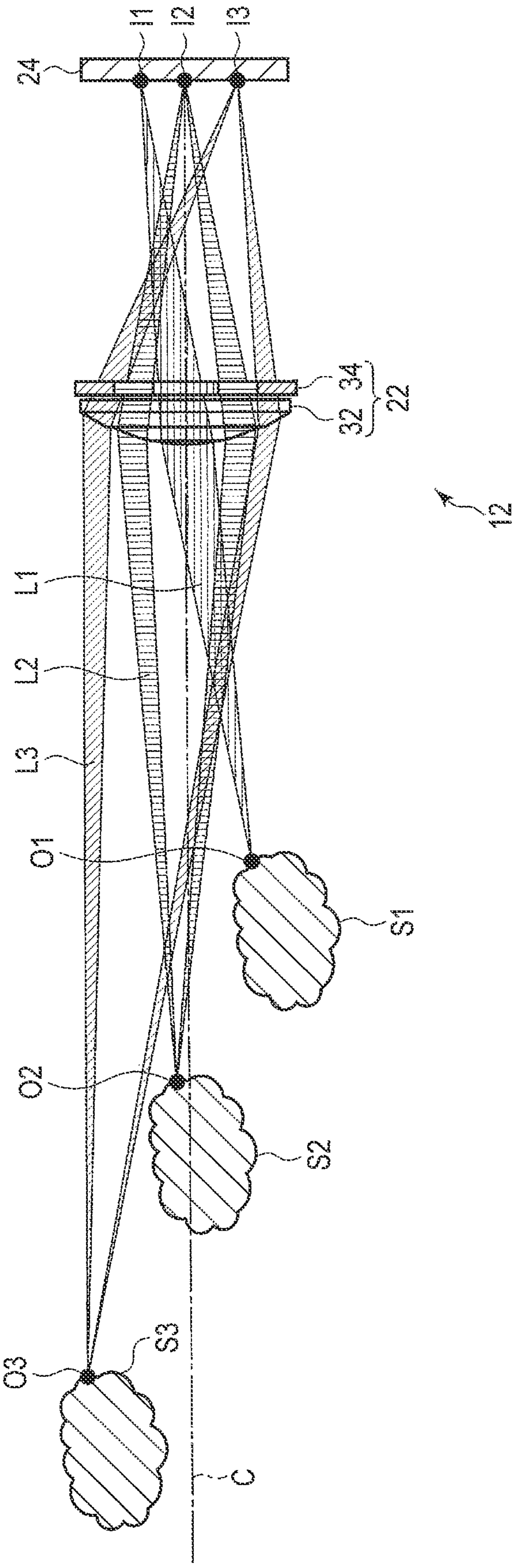
FIG. 6 is a schematic view showing the relationship between the image acquisition portion of the optical apparatus shown in FIGS. 4 and 5 and an object.

As shown in FIG. 6, a first object S1, a second object 32, and a third object S3 are sequentially located at positions far from the optical element assembly 22 and the image sensor 24. That is, among the first object S1, the second object S2, and the third object S3, the third object S3 is farthest from the optical element assembly 22 and the image sensor 24. The third object 33 is located at substantially infinity along the optical axis C.

A first object point O1 of the first object S1 is imaged at a first image point 11 on the image sensor 24, a second object point O2 of the second object S2 is imaged at a second image point 12 on the image sensor 24, and a third object point O3 of the third object S3 is imaged at a third image point 13 on the image sensor 24. A high contrast image of the first object point O1 of the first object S1 is captured as a blue image, a high contrast image of the second object point O2 of the second object S2 is captured as a red image, and a high contrast image of the third object point O3 of the third object S3 is captured as a green image. Accordingly, the optical apparatus 10 according to this embodiment can acquire, as different color images, images of objects simultaneously located at three different depth distances.

Figure 2:
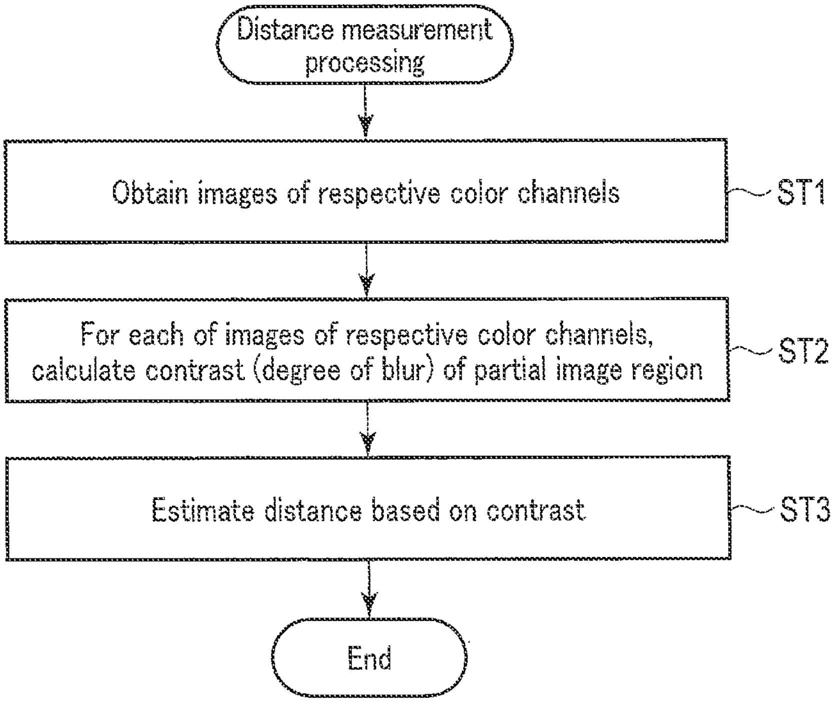
FIG. 2 is a flowchart for estimating the farness/nearness (relative distance) and/or the distance of an object using an image processor shown in FIG. 1.

Therefore, an image processor 14 can output the distances and/or the farness/nearness of the objects (the first object S1, the second object S2, and the third object S3) with respect to the optical element assembly 22 according to the flowchart shown in FIG. 2 described in the first embodiment. In this manner, by using the optical apparatus 10 according to this embodiment, it is possible to simultaneously acquire images of objects located three different depth distances as color images having different contrasts. Then, as has been described in the first embodiment, the image processor 14 can estimate the depth distances of the respective objects and the magnitude relationship of the depth distances (the farness/nearness with respect to the imaging optical element 32 and the image sensor 24).

The optical element assembly 22 according to this embodiment, that is, the imaging optical element 32 and the wavelength selection portion 34, has rotational symmetry. Further, they have cylindrical symmetry which is one form of rotational symmetry. Thus, by using the optical apparatus 10 according to this embodiment, it is possible to acquire robust images with high reproducibility that are not influenced by the rotation angles, that is, the postures of the imaging optical element 32 and the wavelength selection portion 34.

When imaging a given object point at the image point on the image sensor 24 by the imaging optical element 32, the image point is ideally a point. However, in practice, the image point spreads a little due to the aberration, the diffraction limit, and a deviation from the imaging position (the position where the object point is imaged) of the object point. A PSF (Point Spread Function) quantitatively indicates this spread. When an object point deviates from the imaging position, the object point tends to become larger. The PSF is a method of, by utilizing this tendency, estimating the distance from the imaging optical element 32 or the image sensor 24 to the object even from one or a plurality of images (see JP 2020-148483 A, and see P. Trouve, et al., "Passive depth estimation using chromatic aberration and a depth from defocus approach," APPLIED OPTICS/Vol. 52, No. 29, 2013.). Note that the distance estimation utilizing the PSF is effective only in a limited range before and after the imaging position with respect to the imaging position determined by the focal length of the lens.

In this embodiment, the image processor 14 performs distance measurement utilizing the PSF based on images of respective color channels acquired by the image sensor 24. In this embodiment, the imaging optical element 32 simultaneously has three different focal lengths f1, f2, and f3. Therefore, the distances with respect to three different imaging positions corresponding to the three focal lengths f1, f2, and f3 are estimated. Hence, the image processor (processor) 14 can estimate the distances independently based on the PSF from the images of three different color channels.

In this embodiment, the image processor 14 can simultaneously acquire different color images at at least two or more imaging positions (screen positions). Therefore, by using these color images, the image processor 14 can change the reference of the imaging position determined by the focal positions based on the regions 62, 64, and 66 of the first surface 52 of the imaging optical element 32 and the second surface 54 to enlarge the PSF effective range.

According to this embodiment, it is possible to provide the optical element assembly 22 used to acquire the farness/nearness and/or the distance of an object, the optical apparatus 10, and an estimation method (optical estimation method) of the farness/nearness and/or the distance of an object using the optical apparatus 10.

In each of the first embodiment and the second embodiment described above, an example has been described in which the image sensor 24 acquires images of three colors including red (R), green (G), and blue (B). An image sensor that can acquire light beams not only in red (R) green (G), and blue (B) but also in another wavelength range like, for example, a hyperspectral camera may be used as the image sensor 24. In this case, for example, by changing the number of the regions in the first surface 52 of the imaging optical element 32 described in the first embodiment to, for example, four or more to form four or more regions having focal lengths different from each other, the distance and/or the farness/nearness of an object can be estimated in more detail. Alternatively, for example, by changing the number of the curvatures of the first surface 52 of the imaging optical element 32 described in the second embodiment to, for example, four or more, that is, by forming four or more regions having focal lengths different from each other, the distance and/or the farness/nearness of an object can be estimated in more detail. Also in these cases, each of the regions of the first surface 52 of the imaging optical element 32 optically faces corresponding one of the wavelength selection regions of the wavelength selection portion 34.

The refractive index slightly depends on the wavelength. Hence, the focal length varies in accordance with the wavelength even when a single lens is used. For example, general glass has a high refractive index of blue light and a low refractive index of red light. By utilizing this, blue light may be used to acquire an image corresponding to a lens having a short focal length, and red light may be used to acquire an image corresponding to a lens having a long focal length. Alternatively, in order to balance the mutual positional relationship between the focal lengths for respective colors, for example, in this embodiment, the relationship between the green light and the red light may be exchanged to perform adjustment as appropriate.

When blue light is used to acquire an image corresponding to a lens having a short focal length, the curvature of the lens can be reduced compared to a case of using red light. That is, the volume of the lens can be reduced, and this leads to a reduction in cost and facilitation of lens processing. On the other hand, in order to implement a lens having a longer focal length, it is better to use red light rather than blue light. However, this embodiment is not limited to this. For example, if an object that mainly reflects blue is at a far position and an object that mainly reflects red is at a close position, the focal length for blue may be set long and the focal length for red may be set short accordingly. With this, the object can be captured more brightly. Further, lens processing is facilitated if the discontinuous boundary between the regions corresponding to respective colors on the lens surface is as smooth as possible. Therefore, the relationship between each color and the focal length may be adjusted so as to make the discontinuous boundary as smooth as possible.

According to at least one embodiment described above, it is possible to provide an optical element assembly used to acquire the farness/nearness and/or the distance of an object, an optical apparatus, and an estimation method (optical estimation method of farness/nearness and/or distance).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical apparatus comprising:
- an optical element assembly including:
  - a wavelength selection portion comprising a plurality of wavelength selection regions, the wavelength selection portion being configured to emit wavelengths in a predetermined range, the wavelengths being different among the plurality of wavelength selection regions; and
  - an imaging optical element comprising a plurality of different regions,
    - the plurality of regions of the imaging optical element having focal lengths different from each other, and
    - each of the regions of the imaging optical element optically faces corresponding one of the wavelength selection regions of the wavelength selection portion;
- an image sensor configured to capture light emitted from the optical element assembly,
  - the image sensor including at least two different pixels, and
  - each of the pixels having at least two color channels; and
- an image processor connected to the image sensor, the image processor including a processor configured to:
  - acquire images of the at least two color channels by the image sensor,
  - calculate a contrast of a common region of an object for each of the images of the at least two color channels, wherein the contrast is based on spatial gradients or the contrast is based on each of the images; and
  - estimate, based on the contrast of the common region for each of the at least two color channels, a farness/nearness and/or a distance of the object with respect one of the imaging optical element and the image sensor.

2. The optical apparatus according to claim 1, wherein
- the processor is configured to estimate, based on a point spread function, distances of an object with respect to one of the imaging optical element and the image sensor independently of images corresponding to at least two different color channels.

3. An estimation method of farness/nearness and/or a distance of an object using the optical apparatus defined in claim 1, the method including:
- acquiring images of the at least two color channels by an image sensor;
- calculating a contrast of a common region of an object for each of the images of the at least two color channels, wherein the contrast is based on spatial gradients or the contrast is based on each of the images; and
- estimating, based on the contrast of the common region for each of the at least two color channels, farness/nearness and/or a distance of the object with respect to one of the imaging optical element and the image sensor.

4. A non-transitory storage medium storing an estimation program of farness/nearness and/or a distance of an object using the optical apparatus defined in claim 1, the estimation program causing a computer to implement:
- acquiring images of the at least two color channels by an image sensor;
- calculating a contrast of a common region of an object for each of the images of the at least two color channels, wherein the contrast is based on spatial gradients or the contrast is based on each of the images; and
- estimating, based on the contrast of the common region for each of the at least two color channels, farness/nearness and/or a distance of the object with respect to one of the imaging optical element and the image sensor.

5. The optical apparatus according to claim 1, wherein
- when light beams from two object points on an object that pass through the imaging optical element and the wavelength selection portion and are transferred to respective image points are defined as a first light beam and a second light beam,
- the first light beam is configured to pass through a first region of the imaging optical element and further passes through a first wavelength selection region of the wavelength selection portion, and
- the second light beam is configured to pass through a second region of the imaging optical element and further passes through a second wavelength selection region of the wavelength selection portion.

6. The optical apparatus according to claim 1, wherein
- the imaging optical element comprises at least one lens,
- the lens includes the plurality of different regions in one surface of the lens, and
- when the plurality of different regions includes a first region and a second region, a normal of a boundary between the first region and the second region discontinuously changes.

7. The optical apparatus according to claim 1, wherein
- the imaging optical element has rotational symmetry, and the wavelength selection portion has symmetry similar to the rotational symmetry of the imaging optical element.

* * * * *